UNITED STATES PATENT OFFICE.

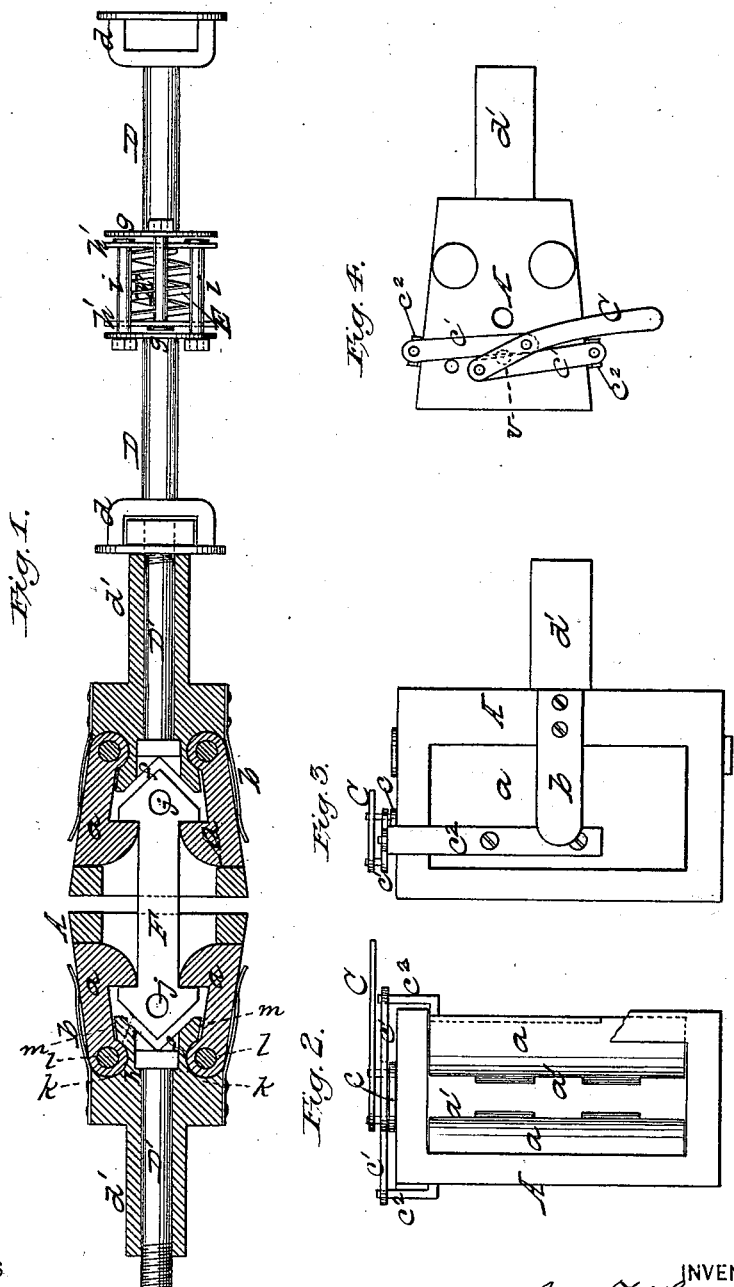

JOHN T. HAUNSON, OF ASHEVILLE, NORTH CAROLINA.

CAR-COUPLING.

SPECIFICATION forming part of Letters Patent No. 226,314, dated April 6, 1880.

Application filed May 12, 1879.

*To all whom it may concern:*

Be it known that I, JOHN T. HAUNSON, of Asheville, in the county of Buncombe and State of North Carolina, have invented a new and valuable Improvement in Car-Couplers and Draw-Bars; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical section of this invention. Fig. 2 is a representation of front view of the mouth of the draw-bar. Fig. 3 is a top view of the same, and Fig. 4 is a side view.

The nature of the invention consists in the construction and novel arrangement of parts, as hereinafter shown and described.

In the accompanying drawings, the letter A designates the draw-head having open sides, the body portion $h$ being angularly recessed, as shown at $f$, and rabbeted on each side, as shown at $k$, to receive the rounded pivotal edges of the jaws $a$, which are abutted in the rounded rabbets, and secured by means of long pivot-bolts $l$, which pass through the draw-heads. In this manner the side jaws are strongly seated, and are not liable to be disengaged or to cause any bending of the pivot-bolts under the shock of coupling.

On the body portion $h$ is formed on each side a stop, $m$, which prevents the jaw from being thrown inward by its spring $b$, which is a strong plate-spring attached centrally to the side of the body portion in rear and extending forward, bearing against the jaw. Each jaw is formed with sloping lips and rectangular notches at different heights, to hold the squared body of the coupling-bar F in the position required.

Through the upper and lower ends of each draw-head are formed openings for the passage of a coupling-pin when desired, and in front of said openings, on the top of the draw-head, is pivoted a lever, C, the body portion of which is connected by pivots on each side of the main pivot $v$ to connecting-bars C' C', which are also connected to arms C² of the side jaws, and serve to force the same open when the lever is thrown into position lengthwise of the draw-head. On each draw-head is formed a hollow stem, $d'$, through which passes a rod or bolt, D'.

D D represent sectional draw-rods, each of which has at one end a rigid disk-head, $g$, having marginal bolt-holes, and at the other a centrally-perforated swivel-head, $d$, which engages with the nut of the bolt D'. The disk end of each draw-rod is connected by bolts $i$ with a spider, $h'$, these opposite spiders and disks being coupled together in a sliding manner by means of these bolts, and, inclosing a strong coil-spring, E, form a yielding connection, which takes the shock of the coupling and prevents injuring the draw-heads and the rod-connections.

I am aware that it is not new to extend a draw-rod the entire length of the car, and that draw-heads have been provided with side jaws opened by means of levers and closed by springs, and therefore I do not claim such construction, broadly.

What I claim, and desire to secure by Letters Patent, is—

1. The draw-head having the open sides and rabbeted body $h$, formed with stops $m$, the side jaws, $a$, pivoted in rear by through-bolts and seated in the side rabbets, and having arms C² extending to the top of the draw-head, connecting-bars C', pivoted to a lever, C, pivoted to the draw-head between said connecting-bars, substantially as specified.

2. The combination, with draw-bars having hollow stems $d'$, of the bolts D' and the swivel-headed sections D $d$, having the rigid perforated end disks, $g$, spiders $h'$, bolts $i$, and coil-spring E, combined and arranged as specified.

In testimony that I claim the above I have hereunto subscribed my name in the presence of two witnesses.

JOHN T. HAUNSON.

Witnesses:
EDWIN L. BROWN,
A. L. SUMMY.